Patented July 4, 1933

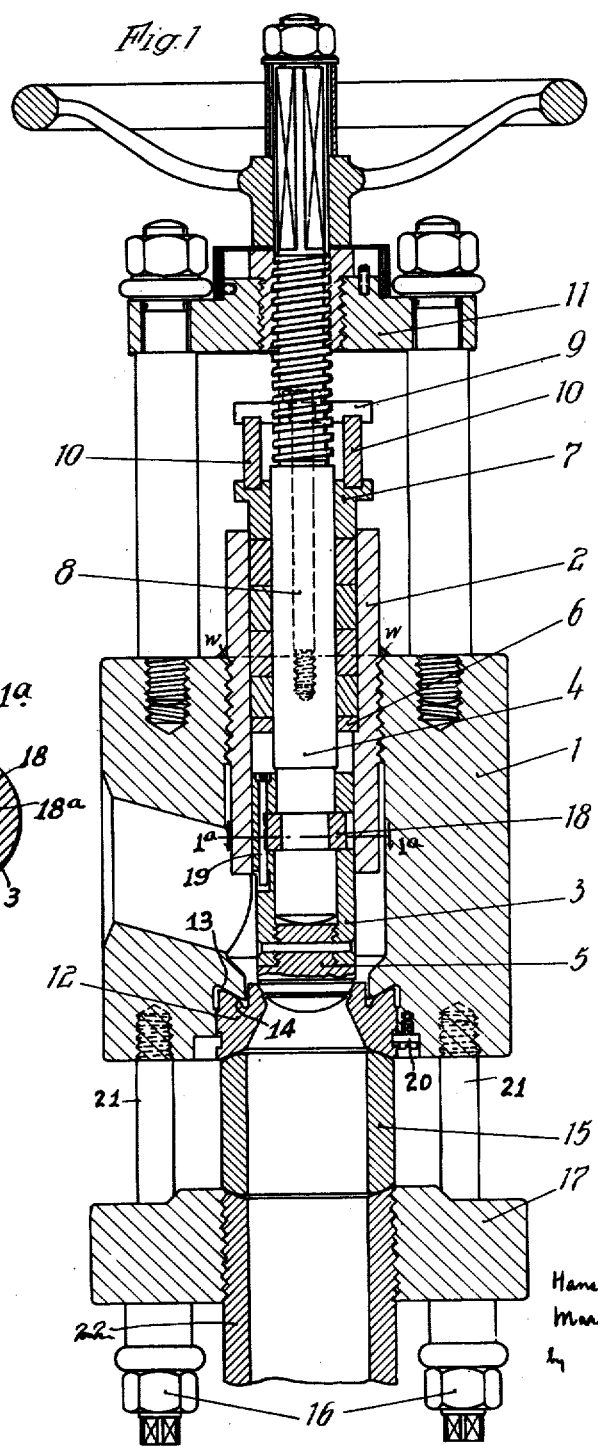

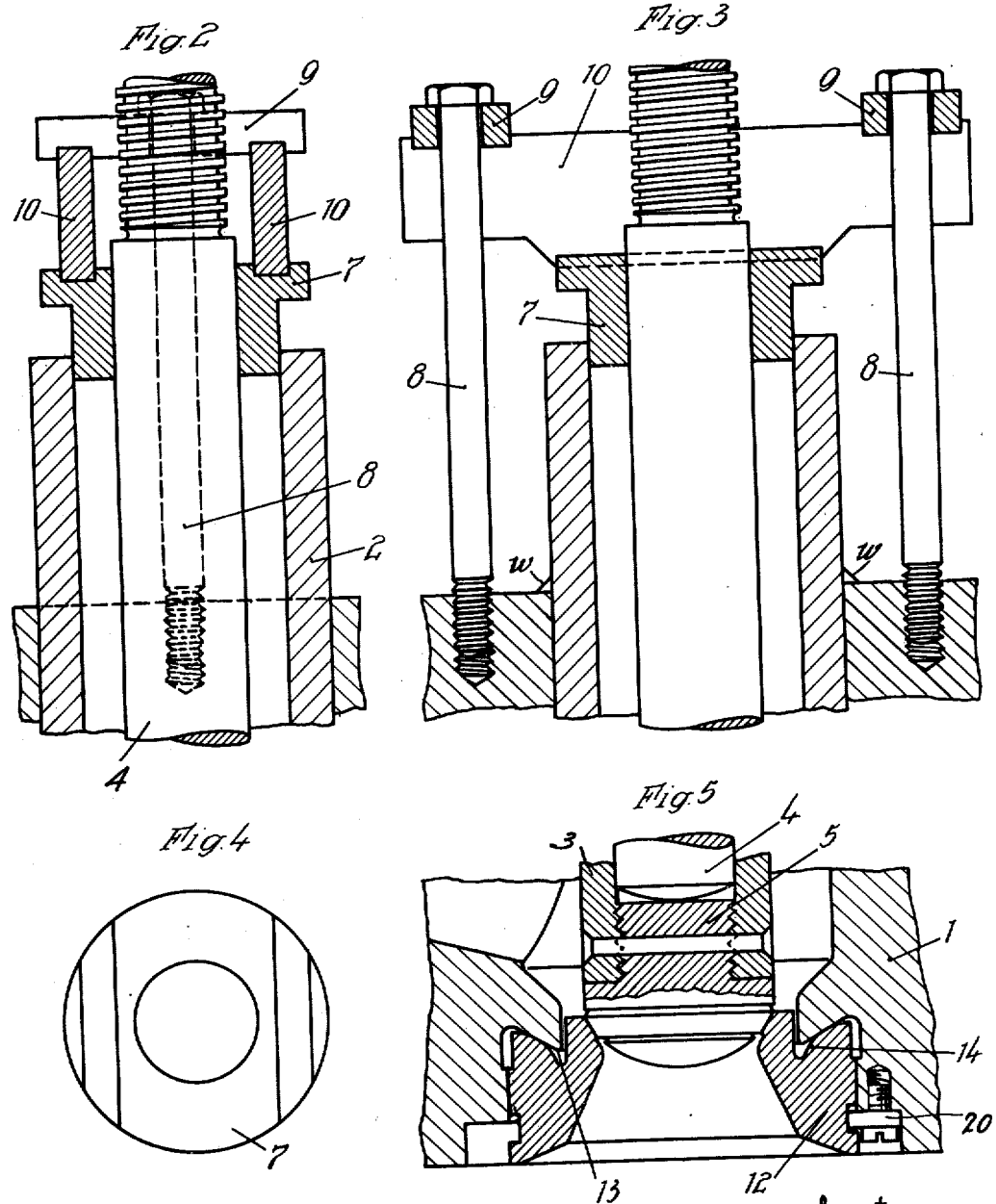

1,916,738

UNITED STATES PATENT OFFICE

HANS MILLER, OF BERLIN-LICHTERFELDE, AND MARTIN EULE, OF BERLIN-SPANDAU, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

VALVE

Application filed July 7, 1931. Serial No. 549,142.

Our invention relates to valves and more particularly to a valve requiring little space.

It frequently happens that valves have to be fitted at a place where the available space for mounting the valve is very limited. For this reason it is often important that the height of the valve should be as small as possible. For the same reason it is also of importance to be able to replace the parts of the valve subject to wear without having to take the valve off the pipe each time. Particularly in the case of heavy valves which should really be mounted by means of a hoisting device but for which the use of the latter is impossible on account of the space being too limited, it must be avoided to have to demount and remount the valve again and again from, or on, the pipe.

The invention relates to a valve the construction of which meets the said requirements in every respect.

Examples for carrying out the invention are illustrated in the accompanying drawings, wherein:

Fig. 1 is a sectional elevation through a valve embodying the invention.

Fig. 1ᵃ is a transverse section through the central valve portion on line 1ᵃ—1ᵃ in Fig. 1.

Figs. 2 and 3 show details of the top part of the stuffing box.

Fig. 4 is a top view of the stuffing-box gland, and

Fig. 5 shows details of the valve seat and the valve head or cone.

The illustrations in Figs. 2 to 5 are on an enlarged scale.

As shown in Fig. 1, the main body 1 of the valve is worked out of a solid piece of material. The member 2, which is cylindrical on its outer side and has a polygonal form inside, is screwed into the member 1 and then secured by means of welding as indicated at $w$. It serves to guide the coupling member 3 connecting the valve spindle 4 with the valve head 5 and also accommodates the stuffing-box ring 6. The space between the ring 6 and the gland 7 contains the packing material for the stuffing box. The gland 7 is pressed down by means of the screws 8. The pressure of the screws 8 is exerted on the bridging members 9 and then transmitted from the latter to the gland 7 by means of two spacing plates 10. To secure the position of the spacing plates 10, the bridging members 9 and the gland 7 are provided with corresponding grooves, as shown in detail in Figs. 2 and 3. The employment of the spacing plates 10 together with the bridging members 9 is of special importance in the present case for the following reason. If it is desired to put more packing material into the packing space of the stuffing box, the screws 8 need only be unscrewed a little. As soon as the pressure of the bridging members 9 upon the plates 10 is relieved, the latter can be drawn out from the side. The gland 7 can then directly be lifted right up, whereby sufficient room is at once obtained to insert the packing material. As, after the removal of the spacing plates 10 the whole of the space above the gland 7 up to the yoke 11 is completely free, the height of the valve may naturally be made less than that of valves in which the spacing member embraces the spindle and always remains over the gland.

It has already been pointed out above that the valve coupling member 3 is guided in the stuffing box member or bushing 2. Hereby, a further reduction of the height of the valve becomes possible. The connection of the valve spindle 4 with the coupling sleeve 3, into which the valve head 5 is screwed, is established by means of a coupling ring 18 consisting of a plurality of segments so placed as to extend partly into a groove in the spindle and partly into an annular recess in the coupling member. For the purpose of inserting ring 18 into the joint annular space thus produced between the sleeve and the spindle, the individual coupling segments of ring 18 are one by one inserted into the coupling space through a lateral opening 18ᵃ provided in the wall of coupling sleeve 3, as shown in Figs. 1 and 1ᵃ. After the last segment has been inserted, the coupling ring is turned so that a longitudinal groove provided in it registers with a similar longitudinal groove provided in sleeve 3, both grooves forming together a boring into which a locking pin 19 is inserted. Owing to this arrangement, the coupling member 3 can, as will be seen in the drawings, without difficulty be made so that its dimensions do not anywhere exceed the interior diameter of the bush 2. When the spindle is then moved upward into its normal operating range, the coupling sleeve 3 is drawn into the bush 2, in which owing to its having a corresponding polygonal form on its outer side is at the same time so guided that it cannot take part in the rotation of the spindle. The fact that the coupling member 3 can be housed within bush 2 when the spindle is in its normal operating range, also enables the height of the valve to be made relatively less than in the valve designs hitherto customary.

A further help towards the solution of the problem of reducing the height of the valve is the manner in which the seal between the valve-seat member 12 and the body 1 is carried out. Hitherto, to obtain a reliable seal particularly against high pressures, a packing ring was placed between the valve body and the valve seat. According to our invention the employment of a packing ring becomes unnecessary by providing the body and the valve-seat member themselves with sealing surfaces.

In the present case, the valve body 1 is provided with a cone-shaped annular surface 13; the valve-seat member 12 also has an annular contact surface 14, which is however, slightly convex. Owing to the inclination of the two sealing surfaces, a wedging effect is produced when the member 12 is pressed against the valve body 1, so that a sure tight seal is obtained. As the surface 14 is slightly curved, the parts are always sure to fit onto each other so that there is no necessity for grinding them in. Valve seat 12 is normally held in position in valve body 1 by means of detachable lugs 20.

At the beginning it has already been mentioned that it is often not possible to use hoisting devices for mounting and demounting valves which are placed in very limited spaces and are therefore not easily accessible. Particularly with heavy valves, this fact must be considered. According to the present invention, the valve is therefore so arranged that it is possible to replace the parts most subject to wear, viz. the valve seat 12 and the valve head 5, at any time without having to take down the valve. For this purpose a spacing ferrule 15 is provided between conduit 22, to which the valve body is attached by means of plate 17 and bolts 21. This ferrule is made at least as long as the height of the valve seat 12 or of the valve head 5, whichever is the higher. To take out the members 12 and 5 and replace them by new ones, all that is necessary is to loosen the nuts 16 of bolts 21 slightly, to raise body 1 slightly and to support it temporarily on plate 17 by any suitable means, sufficient to take out the spacing ferrule 15. By this means enough room is cleared between the body 1 and the supporting flange 17 to take out the members 12 and 5 and replace them by new ones. Of course the joints between ferrule 15 and valve seat 12 and the conduit 22 may be constructed similar to the joint surfaces 13, 14 described hereinabove.

We claim as our invention:

1. A valve consisting of a valve body, a valve head disposed in said body and a valve seat for said head set into the body, a valve spindle, a coupling sleeve between said head and said spindle, slidingly but non-rotatably disposed in said body and surrounding the spindle end and having said valve head fixed to it at one of its ends, said sleeve containing a segmented coupling ring, segmentally insertable into said sleeve and disposed to engage said sleeve and said spindle to rotatably couple the latter to the sleeve for imparting the longitudinal spindle movements to the valve head.

2. A valve consisting of a valve body, a valve head disposed in said body and a valve seat for said head set into the body, a valve spindle, a coupling sleeve between said head and said spindle, slidingly but non-rotatably disposed in said body and surrounding the spindle end and having said valve head fixed to it at one of its ends, said sleeve and said spindle end having registering annular recesses in adjoining wall surfaces forming together an annular space, and a segmented coupling ring, segmentally insertable through the sleeve wall into said annular space for coupling said sleeve to said spindle to partake in the longitudinal movements of the latter, and to impart said movements to the valve head, and means for securing said coupling ring in position in said space.

3. A valve consisting of a valve body, a valve head disposed in said body, a valve spindle for operating said head and a valve seat for said head disposed in said body, a cylindrical stuffing box bushing fixed in said body, and having means for rotatably guiding the valve spindle, packing material in said bushing surrounding the spindle and a packing gland on the spindle disposed in the upper sleeve end, a pair of pressure members, spaced a distance above said gland, one on each side of the spindle, and removable spacers between said members and said gland, and means for forcing said members toward the valve body to move the gland into said bushing for compressing the packing therein, said spacers having sufficient depth to permit, when withdrawn the removal of the gland from said bushing sufficiently far for inserting additional packing material into said bushing.

4. A valve consisting of a valve body, a valve head disposed in said body, a valve spindle for operating said head, and a valve seat for said head set into the body, a cylindrical stuffing box bushing fixed in said body and containing said spindle, a coupling sleeve slidingly disposed in the inner end of said bushing, and means for preventing relative rotation between said sleeve and bushing, said sleeve having the spindle end rotatably disposed in its interior and having said valve head fixed to its free end, said sleeve and said spindle end having registering annular recesses in adjoining wall surfaces, forming together an annular space, and a segmented coupling ring, segmentally insertable through the sleeve wall into said annular space for coupling said sleeve to said spindle to partake in the longitudinal movements of the latter, and to impart said movements to the valve head, and means for securing said coupling ring in position in said space.

5. A valve comprising a valve body and a conduit, a supporting member fixed on the conduit portion to which the valve is attached, and means for pressing said body toward said supporting member, a valve head disposed in said body, a valve spindle for operating and detachably carrying said head and a valve seat for said head removably attached to said body, a spacing ferrule removably interposed between said valve and the conduit and having sufficient length to permit the removal of said valve seat and said head through the space left between the valve body and the conduit when the ferrule is removed, and surface joints between said conduit, said ferrule, said valve seat and said valve body, all held together in fluid tight contact by said body pressing means.

6. A valve comprising a valve body and a conduit, a supporting member fixed on the conduit portion to which the valve is attached, and means for pressing said body toward said supporting member, a valve head disposed in said body, a valve spindle for operating and detachably carrying said head and a valve seat for said head removably attached to said body, a spacing ferrule removably interposed between said valve seat and the conduit and having sufficient length to permit the removal of said valve seat and said head through the space left between the valve body and the conduit when the ferrule is removed, and surface joints between said conduit, said ferrule, said valve seat and said valve body, all held together in fluid tight contact by said body pressing means, one member of each of said joints having a cone shaped annular surface, and the other member having a convex annular surface contacting with said cone shaped surface.

In testimony whereof we affix our signatures.

HANS MILLER.
MARTIN EULE.

CERTIFICATE OF CORRECTION.

Patent No. 1,916,738.

July 4, 1933.

HANS MILLER, ET AL.

It is hereby certified that error appears in the printed specification of the above numbered patent requiring correction as follows: Page 1, in the heading to the printed specification, application clause, strike out the second period and insert ", and in Germany, November 4, 1930."; and that the said Letters Patent should be read with this correction therein that the same may conform to the record of the case in the Patent Office.

Signed and sealed this 22nd day of August, A. D. 1933.

M. J. Moore.

(Seal)

Acting Commissioner of Patents.

spindle for operating said head, and a valve seat for said head set into the body, a cylindrical stuffing box bushing fixed in said body and containing said spindle, a coupling sleeve slidingly disposed in the inner end of said bushing, and means for preventing relative rotation between said sleeve and bushing, said sleeve having the spindle end rotatably disposed in its interior and having said valve head fixed to its free end, said sleeve and said spindle end having registering annular recesses in adjoining wall surfaces, forming together an annular space, and a segmented coupling ring, segmentally insertable through the sleeve wall into said annular space for coupling said sleeve to said spindle to partake in the longitudinal movements of the latter, and to impart said movements to the valve head, and means for securing said coupling ring in position in said space.

5. A valve comprising a valve body and a conduit, a supporting member fixed on the conduit portion to which the valve is attached, and means for pressing said body toward said supporting member, a valve head disposed in said body, a valve spindle for operating and detachably carrying said head and a valve seat for said head removably attached to said body, a spacing ferrule removably interposed between said valve and the conduit and having sufficient length to permit the removal of said valve seat and said head through the space left between the valve body and the conduit when the ferrule is removed, and surface joints between said conduit, said ferrule, said valve seat and said valve body, all held together in fluid tight contact by said body pressing means.

6. A valve comprising a valve body and a conduit, a supporting member fixed on the conduit portion to which the valve is attached, and means for pressing said body toward said supporting member, a valve head disposed in said body, a valve spindle for operating and detachably carrying said head and a valve seat for said head removably attached to said body, a spacing ferrule removably interposed between said valve seat and the conduit and having sufficient length to permit the removal of said valve seat and said head through the space left between the valve body and the conduit when the ferrule is removed, and surface joints between said conduit, said ferrule, said valve seat and said valve body, all held together in fluid tight contact by said body pressing means, one member of each of said joints having a cone shaped annular surface, and the other member having a convex annular surface contacting with said cone shaped surface.

In testimony whereof we affix our signatures.

HANS MILLER.
MARTIN EULE.

CERTIFICATE OF CORRECTION.

Patent No. 1,916,738.　　　　　　　　　　　　　　　　　　　　　July 4, 1933.

HANS MILLER, ET AL.

It is hereby certified that error appears in the printed specification of the above numbered patent requiring correction as follows: Page 1, in the heading to the printed specification, application clause, strike out the second period and insert ", and in Germany, November 4, 1930."; and that the said Letters Patent should be read with this correction therein that the same may conform to the record of the case in the Patent Office.

Signed and sealed this 22nd day of August, A. D. 1933.

M. J. Moore.

(Seal)　　　　　　　　　　　　　　　　　　　　　　　　Acting Commissioner of Patents.

CERTIFICATE OF CORRECTION.

Patent No. 1,916,738.  July 4, 1933.

HANS MILLER, ET AL.

It is hereby certified that error appears in the printed specification of the above numbered patent requiring correction as follows: Page 1, in the heading to the printed specification, application clause, strike out the second period and insert ", and in Germany, November 4, 1930."; and that the said Letters Patent should be read with this correction therein that the same may conform to the record of the case in the Patent Office.

Signed and sealed this 22nd day of August, A. D. 1933.

M. J. Moore.

(Seal)  Acting Commissioner of Patents.